US011410558B2

(12) United States Patent
Ganti et al.

(10) Patent No.: US 11,410,558 B2
(45) Date of Patent: Aug. 9, 2022

(54) TRAFFIC CONTROL WITH REINFORCEMENT LEARNING

(71) Applicant: International Business Machines Corporation, Armonk, NY (US)

(72) Inventors: Raghu Kiran Ganti, Elmsford, NY (US); Mudhakar Srivatsa, White Plains, NY (US); Venkatesh Ashok Rao Rao, Natick, MA (US); Linsong Chu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 16/417,960

(22) Filed: May 21, 2019

(65) Prior Publication Data

US 2020/0372809 A1 Nov. 26, 2020

(51) Int. Cl.
G08G 5/00 (2006.01)
G08G 5/04 (2006.01)
G06N 5/04 (2006.01)
G06N 20/00 (2019.01)
G06N 3/08 (2006.01)

(52) U.S. Cl.
CPC ............. *G08G 5/0013* (2013.01); *G06N 5/04* (2013.01); *G06N 20/00* (2019.01); *G08G 5/04* (2013.01); *G06N 3/08* (2013.01)

(58) Field of Classification Search
CPC .......... G08G 5/0013; G08G 5/04; G06N 5/04; G06N 20/00; G06N 3/08
See application file for complete search history.

(56) References Cited

U.S. PATENT DOCUMENTS

| 8,860,602 | B2 | 10/2014 | Nohara et al. |
| 9,679,258 | B2 | 6/2017 | Mnih |
| 10,139,825 | B2 | 11/2018 | Groden et al. |
| 11,107,001 | B1* | 8/2021 | Bertram .................... G06N 3/08 |
| 2013/0261850 | A1* | 10/2013 | Smith .................. G08G 5/0021 701/3 |
| 2016/0247407 | A1* | 8/2016 | Paczan ...................... G01S 5/16 |

(Continued)

FOREIGN PATENT DOCUMENTS

WO    2016210156 A1    12/2016

OTHER PUBLICATIONS

Agogino et al., "A multiagent approach to managing air traffic flow", Autonomous Agents and Multi-Agent Systems. 24:1, p. 1-25, 2012, first published Jun. 27, 2010.

(Continued)

*Primary Examiner* — Hunter B Lonsberry
*Assistant Examiner* — Harrison Heflin
(74) *Attorney, Agent, or Firm* — Gilbert Harmon, Jr.

(57) ABSTRACT

An action recommendation system uses reinforcement learning that provides a next action recommendation to a traffic controller to give to a vehicle pilot such as an aircraft pilot. The action recommendation system uses data of past human actions to create a reinforcement learning model and then uses the reinforcement learning model with current ABS-B data to provide the next action recommendation to the traffic controller. The action recommendation system may use an anisotropic reward function and may also include an expanding state space module that uses a non-uniform granularity of the state space.

15 Claims, 6 Drawing Sheets

State Space Around Airport With Non-uniform Grid Size

(56) References Cited

U.S. PATENT DOCUMENTS

| | | | | |
|---|---|---|---|---|
| 2017/0024643 | A1 | 1/2017 | Lillicrap et al. | |
| 2018/0118238 | A1* | 5/2018 | de Albuquerque Gleizer | B61L 3/02 |
| 2019/0005828 | A1* | 1/2019 | Costas | G08G 5/045 |
| 2019/0392726 | A1* | 12/2019 | Pesquet | G08G 5/0013 |
| 2020/0168104 | A1* | 5/2020 | Holder | B64D 45/00 |
| 2020/0226940 | A1* | 7/2020 | Srinivasan | G08G 5/0078 |
| 2020/0319609 | A1* | 10/2020 | Qian | G06N 3/08 |
| 2021/0063429 | A1* | 3/2021 | Tucker | G01S 17/95 |
| 2021/0150388 | A1* | 5/2021 | Eto | G06Q 30/0206 |
| 2021/0261123 | A1* | 8/2021 | Wray | B60W 30/18163 |
| 2021/0276531 | A1* | 9/2021 | Xu | B60W 20/20 |
| 2022/0001895 | A1* | 1/2022 | Inaba | B60W 30/00 |

OTHER PUBLICATIONS

Yung et al., "An Intelligent Mobile Vehicle Navigator Based on Fuzzy Logic and Reinforcement Learning", IEEE Transactions on Systems, Man, and Cybernetics—Part B: Cybernetics, vol. 29, No. 2, p. 314-321, Apr. 1999.

Cruciol et al.. "Air Holding Problem Solving by Reinforcement Learning to Reduce the Congestion in Airspace Sectors", Proceedings on the International Conference on Artificial Intelligence (ICAI), The Steering Committee of the World Congress in Computer Science, Computer Engineering and Applied Computing (WorldComp), 2012.

Crespo et al., "ATFM computational agent based on reinforcement learning aggregating human expert experience." 2011 IEEE Forum on Integrated and Sustainable Transportation System (FISTS), 2011.

Esposito et al., "Improving the gossiping effectiveness with distributed strategic learning." Future Generation Computer Systems 71, p. 221-233, 2017.

Ho et al., "Learning Coordination Strategies for Cooperative Multiagent Systems", Machine Learning 33, p. 155-177, 1998.

Finlayson, "Incremental Knowledge Acquisition for Complex Multiagent Environments", Dissertation, University of New South Wales, Sydney, Australia, 2008.

"Automatic Dependent Surveillance-Broadcast (ADS-B)", Federal Aviation Administration, page last modified: Nov. 30, 2021, 2 pages, <https://www.faa.gov/nextgen/programs/adsb/>.

"Operator FlightPathEncounter", IBM, downloaded from the internet on Feb. 24, 2022, 6 pages, <https://www.ibm.com/docs/en/streams/4.3.0?topic=comibmstreamsgeospatial-flightpathencounter>.

Agogino et al., "Learning Indirect Actions in Complex Domains: Action Suggestions for Air Traffic Control", Advances in Complex Systems (2009), vol. 12, Mar. 2, 2010, 17 pages.

* cited by examiner

TRAFFIC CONTROL WITH REINFORCEMENT LEARNING

BACKGROUND

1. Technical Field

This disclosure generally relates to computer systems, and more specifically relates to a computer system and method for traffic control with reinforcement learning which provides a next action recommendation to a traffic controller to give to a pilot.

2. Background Art

Air traffic control (ATC) is a service provided by ground-based controllers to direct aircraft through controlled airspace. The primary purpose of ATC worldwide is to prevent collisions, organize and expedite the flow of air traffic, and provide information and other support for pilots. To prevent collisions, ATC enforces traffic separation rules, which ensure each aircraft maintains a minimum amount of empty space around it at all times. Air traffic control is a complex process, where aircrafts landing/taking off are directed by human controllers. As the traffic increases, there is very little room for error. Errors in this domain can be catastrophic and thus the controller's job can be extremely stressful.

Automatic Dependent Surveillance Broadcast (ADS-B) is an aircraft tracking technology that allows pilots and air traffic controllers to virtually see and track aircraft traffic with much more precision than was possible with radar thus providing safer and more efficient flight in our airspace. In the USA, ADS-B is part of the Federal Aviation Administration's (FAA) NextGen air traffic management system. The FAA NextGen system tracks aircraft using the aircraft's "ADS-B Out" transmitted data which transmits packets providing the aircraft's position, altitude, speed and other data. The ADS-B system provides a significant improvement in aviation safety by providing near real time aircraft traffic to airborne aircraft and air traffic controllers within ADS-B coverage areas.

BRIEF SUMMARY

An action recommendation system uses reinforcement learning that provides a next action recommendation to a traffic controller to give to a vehicle pilot such as an aircraft pilot. The action recommendation system uses data of past human actions to create a reinforcement learning model and then uses the reinforcement learning model with current ADS-B data to provide the next action recommendation to the traffic controller. The action recommendation system may use an anisotropic reward function and may also include an expanding state space module that uses a non-uniform granularity of the state space.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 7 is a flow diagram of that shows an example flow for step 520 in method 500; and.

DETAILED DESCRIPTION

The disclosure and claims herein relate to a method and system for an action recommendation system that uses reinforcement learning that provides a next action recommendation to a traffic controller to give to a vehicle pilot such as an aircraft pilot. The action recommendation system uses data of past human actions to create a reinforcement learning model and then uses the reinforcement learning model with current ADS-B data to provide the next action recommendation to the air traffic controller. The action recommendation system may use an anisotropic reward function and may also include an expanding state space module that uses a non-uniform granularity of the state space.

Figure 1:
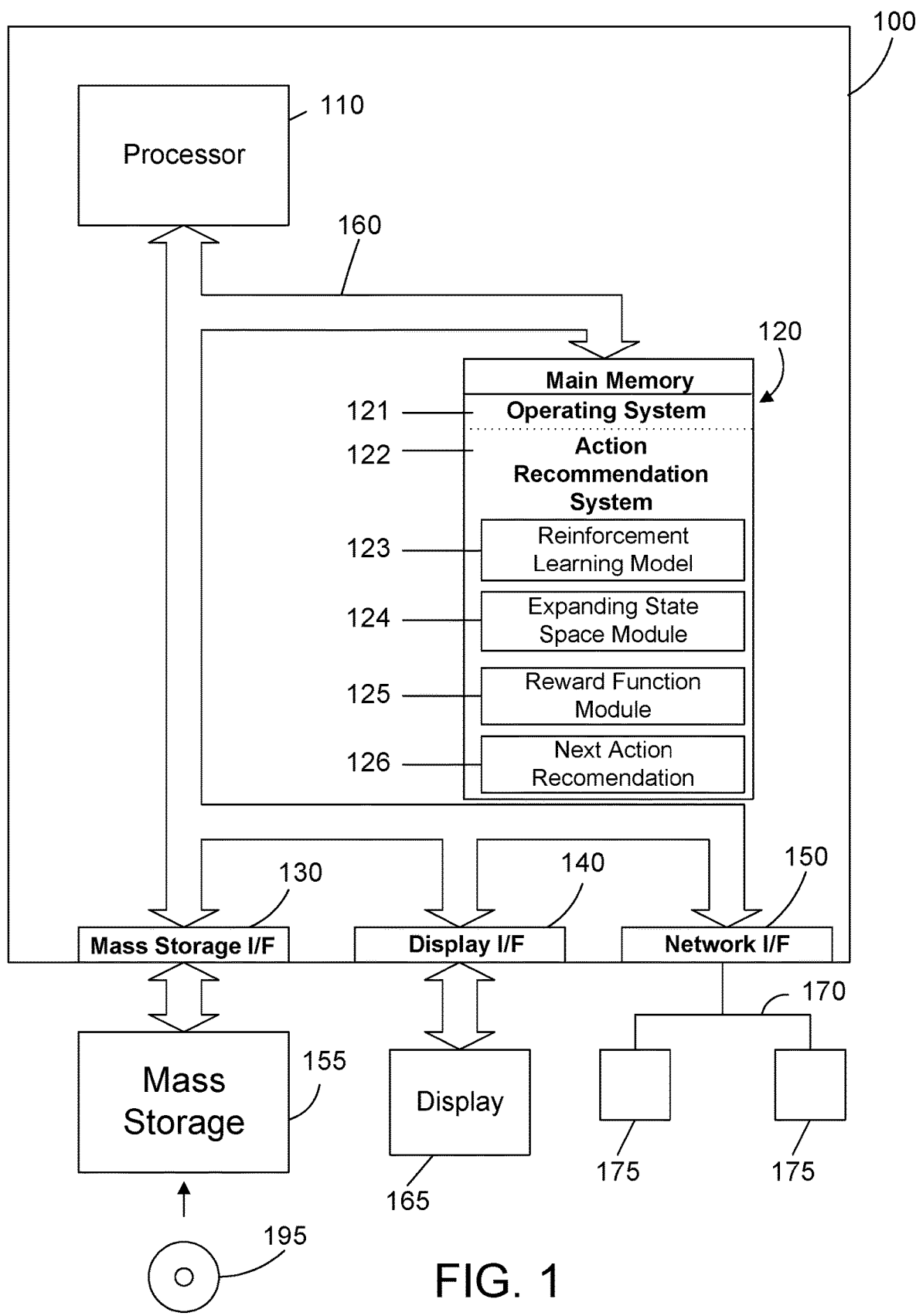
FIG. 1 illustrates a block diagram of a computer system with an action recommendation system using reinforcement learning.

Referring to FIG. 1, a computer system 100 is one suitable implementation of a computer system that is capable of performing the computer operations described herein including an action recommendation system for an air traffic controller using reinforcement learning. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes an action recommendation system 122 with a learning reinforcement model 123. The memory 120 also includes an expanding state space module 124, a reward function module 125 and a next action recommendation 126. Each of these entities in the memory 120 are described further below.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, action recommendation system 122, reinforcement learning model 123, expanding state space module 124, the reward function module 125 and the next action recommendation 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the action recommendation system 122.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g., web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

Figure 2:
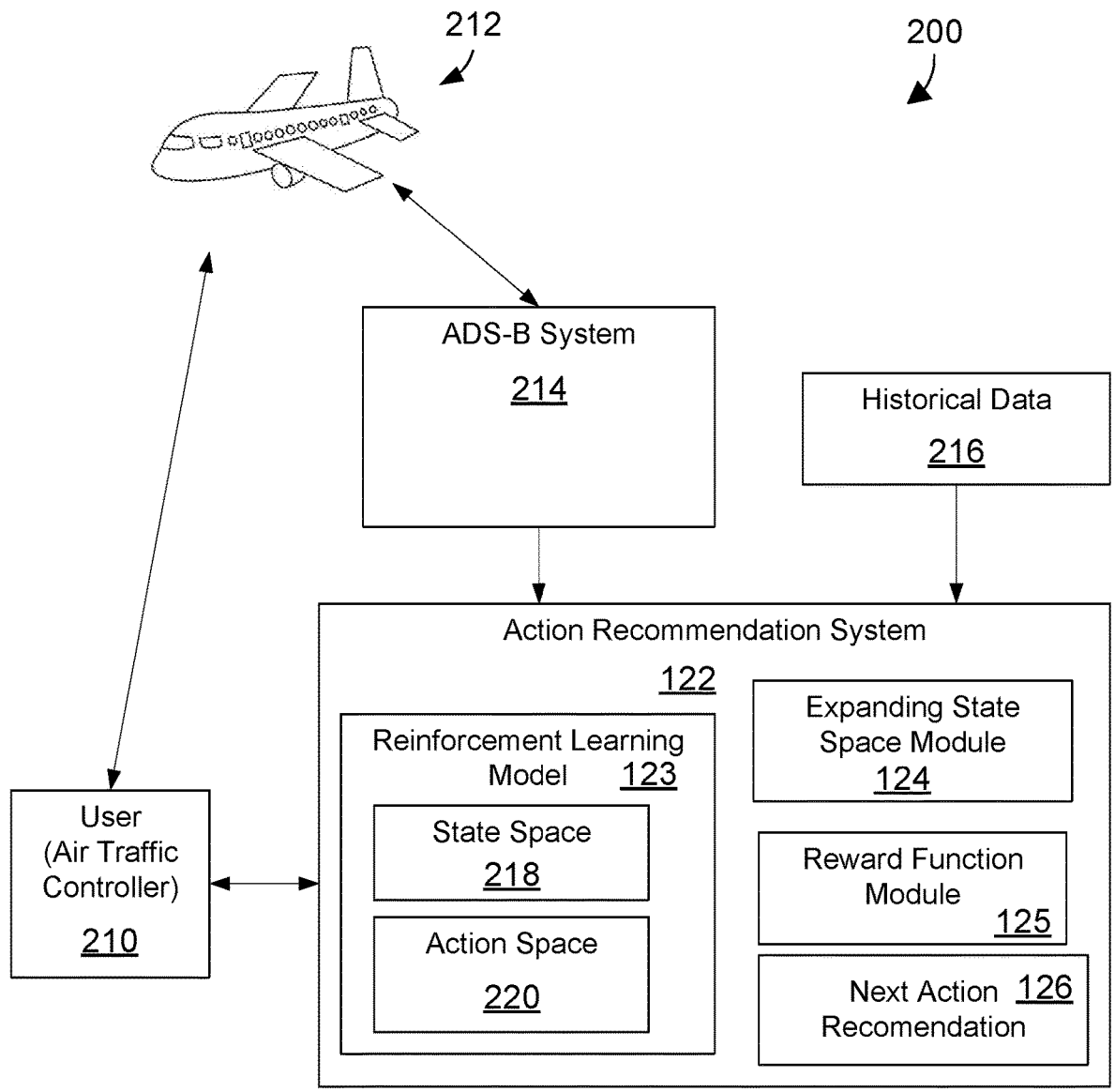
FIG. 2 is a block diagram that illustrates air traffic control with an action recommendation system using reinforcement learning as described herein.

FIG. 2 is a block diagram that illustrates an air traffic control system 200 with an action recommendation system 122 executing in a computer system such as computer system 100 shown in FIG. 1. The action recommendation system 122 receives historical data 216 of past actions taken by human air traffic controllers from a historical database to create a reinforcement learning model 123. The action recommendation system 122 also receives ADS-B data from an ADS-B system 214 for one or more aircraft 212. The action recommendation system 122 uses reinforcement learning and the learning model 123 to provide a next action recommendation 126 for the aircraft 212. The next action recommendation is typically received by a user/air traffic controller 210 who then provides air traffic control instructions to the pilot of the aircraft 212.

As introduced above, Automatic Dependent Surveillance Broadcast (ADS-B) is an aircraft tracking technology that allows pilots and air traffic controllers to "see" aircraft traffic with increased precision over prior radar systems. The NextGen air traffic system tracks aircraft using the aircraft's "ADS-B Out" transmitted data which transmits packets providing the aircraft's position, altitude, speed and other data. The ADS-B system 214 includes ground based transceivers at the airport (not shown) that receive the ADS-B data from the ADS-B Out equipped aircraft. The ADS-B data can then be used by the action recommendation system as described herein. The received ADS-B data can also be combined with radar data from FAA Radar sites and then the combined data transmitted to aircraft equipped with "ADS-B In" capability. The ADS-B system provides a significant improvement in aviation safety by providing near real time aircraft traffic and weather to airborne aircraft within ADS-B coverage areas.

Again referring to FIG. 2, the action recommendation system 122 receives historical data 216 of past human actions from a historical database to create the reinforcement learning model 123. Air traffic control data is continuously recorded and is available for public use. This previously recorded data is represented here by the historical data 216. The data in the historical database describes past actions taken by human air traffic controllers across airports worldwide. The action recommendation system 122 imports the historical data 216 and uses this data as a reference to build the reinforcement learning model 123. The reinforcement learning model 123 may be built in any suitable manner as known in the prior art or devised in the future. For example, the reinforcement learning model may be built using simulations that learns to map state-action pairs to rewards. The simulations run through multiple scenarios from the data where aircraft are controlled by an agent. Each simulation results in the model learning the best actions to take to maximize the reward. In a neural network version (DeepQ learning), the weights of the neurons and connectivity represent the learned information. This representation of the learned information is the reinforcement learning model 123.

Reinforcement learning involves an agent, a set of states, a set of actions per state and rewards. The state describes the current situation of the agent. An action is what an agent can do in each state. When the agent takes an action, it receives a reward that is the result of the action. By performing an action, the agent transitions from state to state. Executing an action in a specific state provides the agent with a reward (a numerical score). The goal of the agent is to maximize its total (future) reward. It does this by adding the maximum reward attainable from future states to the reward for achieving its current state, effectively influencing the current action by the potential future reward. This potential reward is a weighted sum of the expected values of the rewards of all future steps starting from the current state. Reinforcement learning also uses rules that describe what the agent observes.

A reinforcement learning agent interacts with its environment in discrete time steps. At each time t, the agent receives an observation, which typically includes the reward. It then chooses an action from the set of available actions, which is subsequently sent to the environment. The environment moves to a new state and the reward associated with the transition is determined. The goal of a reinforcement learning agent is to collect as much reward as possible. The agent can choose any action as a function of the history. When the agent's performance is compared to that of an agent that acts optimally, the difference in performance gives rise to the notion of regret. In order to act near optimally, the agent must reason about the long term consequences of its actions (i.e., maximize future income of the rewards function module), although the immediate reward associated with this might be negative. Reinforcement learning is particularly well-suited to problems that include a long-term versus short-term reward trade-off such as the air traffic control scenario described herein.

As described above, the action recommendation system 122 receives historical data 216 of past human actions from a historical database to create the reinforcement learning model 123. The action recommendation system 122 may also use other forms of reinforcement learning. For example, the action recommendation system 122 could also use deep Q reinforcement learning. Deep Q reinforcement learning seeks to optimize the cumulative reward for state-action combinations. In deep Q reinforcement learning a neural network is used to approximate Q values. In deep Q reinforcement learning, the neural network takes the place of the reinforcement learning model 123. Thus in embodiments where deep Q reinforcement learning is used, the reinforcement learning model 123 in FIG. 2 would comprise a neural network.

In an air traffic control environment, the aircrafts' movements in a particular airspace are guided by specific rules and a set of possible actions under the guidance provided by the air traffic controller. Using reinforcement learning in this environment, the action recommendation system 122 uses the reinforcement model to determine a recommended action to get to the next state or the next best state that will maximize the reward function. In this case, the reward function seeks to keep the aircraft from not coming too close to other aircraft and the final state being that of landing/reaching the gate or leaving the airspace and reaching cruising altitude.

Again referring to FIG. 2, the reinforcement learning model 123 includes a state space 218 and an action space 220. The state space 218 represents a three dimensional space for the movement of aircraft in a defined region of airspace. The state space 218 is preferably non-uniform to reduce the size of the model or neural network describing the state space. The state spaces 218 can have non-uniform aspects vertically and horizontally. The non-uniform aspects can take advantage of the differences in aircraft safety guidelines for acceptable separation distances in the horizontal and vertical planes. For example, 1000 ft is an acceptable safe separation in the vertical plane, but the same distance is unacceptable in the horizontal plane. Thus the state space can have a larger granularity in the vertical plane and still achieve the required safety. In the horizontal plane, the state space can also have an expanding state space as the plane move away from congested areas as described further with reference to FIG. 3.

The action space 220 in the reinforcement learning model 123 includes actions or next steps that can be taken by an aircraft. The action space 220 can include flight criteria including aircraft type, fuel consumption, length of the flight, on-time arrival and departure, weather, FAA regulations, remaining fuel, etc. The reward function in the action recommendation system is provided by the reward function module 125. The reward function module 125 computes a reward for each action in the action space 220. The reward function module 125 computes a reward that reflects when an aircraft is getting too close to other aircraft or violating other rules such as proper altitude or flying in a no-fly zone. The reward function can also use the flight criteria included in the action space described above. For example, an exponential reward function may negatively reward the learning mechanism as the fuel required for the aircraft to reach its destination becomes depleted. In yet another example, the flight time in the flight criteria can be used for landing priority. For example, an international flight which has been in flight already for a longer time gets a higher reward if landed earlier than a short haul flight.

Figure 3:
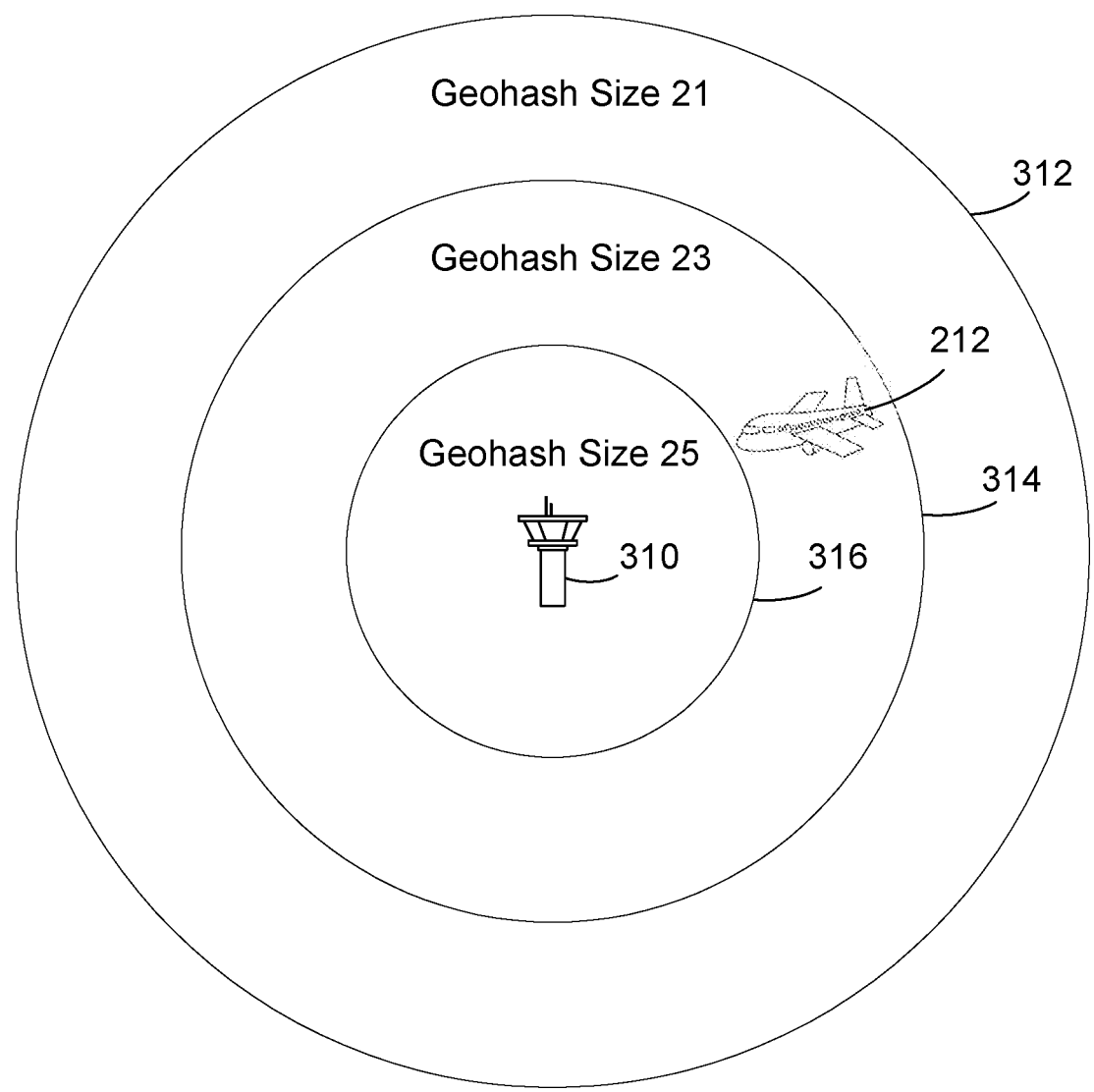
FIG. 3 is a diagram that illustrates the operation of the expanding state space module.

FIG. 3 shows a diagram that illustrates the operation of the expanding state space module 124 introduced above. The state space 218 in the reinforcement learning model 123 is iteratively expanded by expanding the state space model 124 to increase the accuracy of the next action recommendation. Thus, in the horizontal plane the state space can have an expanding state space as the plane moves towards a congested area or known destination such as the destination airport. Conversely, the state space moving away from the airport can be compacted to reduce the size of the model or neural network to improve efficiency as described above. The expanding state space module 124 changes the granularity of the state space depending on the distance of the aircraft from a fixed location such as an airport or control tower. In the illustrated example of FIG. 3, as an aircraft 212 approaches a control tower 310, the aircraft 212 proceeds through 3 different circular zones 312, 314, 316. The outer zone 312 has the greatest granularity or cuboid size, the middle zone 314 has a smaller granularity, and the inner or closest zone 316 has the smallest granularity. In the example shown in FIG. 3, the granularity of the zones 312, 314, 316 are represented as a geohash size. The outer zone 312 has a geohash size of 21 (about 8.7 km), the middle zone 314 has geohash size of 23, and the inner zone 316 has the smallest granularity with a geohash size of 25 (about 2.4 km).

Figure 4:
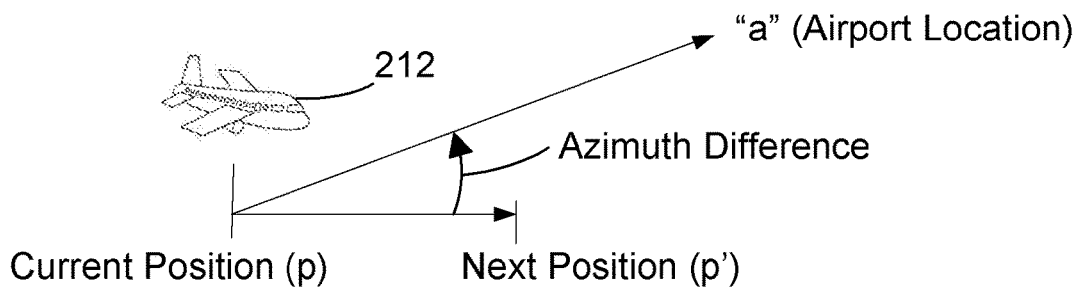
FIG. 4 is an example of an anisotropic reward function used to calculate the next position of an aircraft.

FIG. 4 helps to illustrate an example of an anisotropic reward function used to calculate the reward for a next position of an aircraft. Reinforced learning applications typically use an isotropic function where rewards do not vary in magnitude depending on the direction. In contrast, an anisotropic reward function is used to change the rewards as the aircraft gets closer to the destination. Using an anisotropic reward function is advantageous and can be utilized because the destination of the aircraft is known where the ADS-B data includes the aircraft's destination. We will now consider an example of an anisotropic reward function. First, suppose that the aircrafts current position is p and as per the recommended action the next position is p' as shown in FIG. 4 and let position "a" be the location of the airport. An example of an anisotropic reward R is: $R=1/(1+azdiff(az(p, a), az(p,p')))$, where $az(.,.)$ is the azimuth (heading) between the two points and azdiff is the angular difference between two headings. If $az(p, a)=az(p, p')$ then the reward is maximum=1.0. On the other hand, if $az(p, p')=az(p, a)+pi$, then the reward is the lowest at $1/(1+pi)$.

Figure 5:
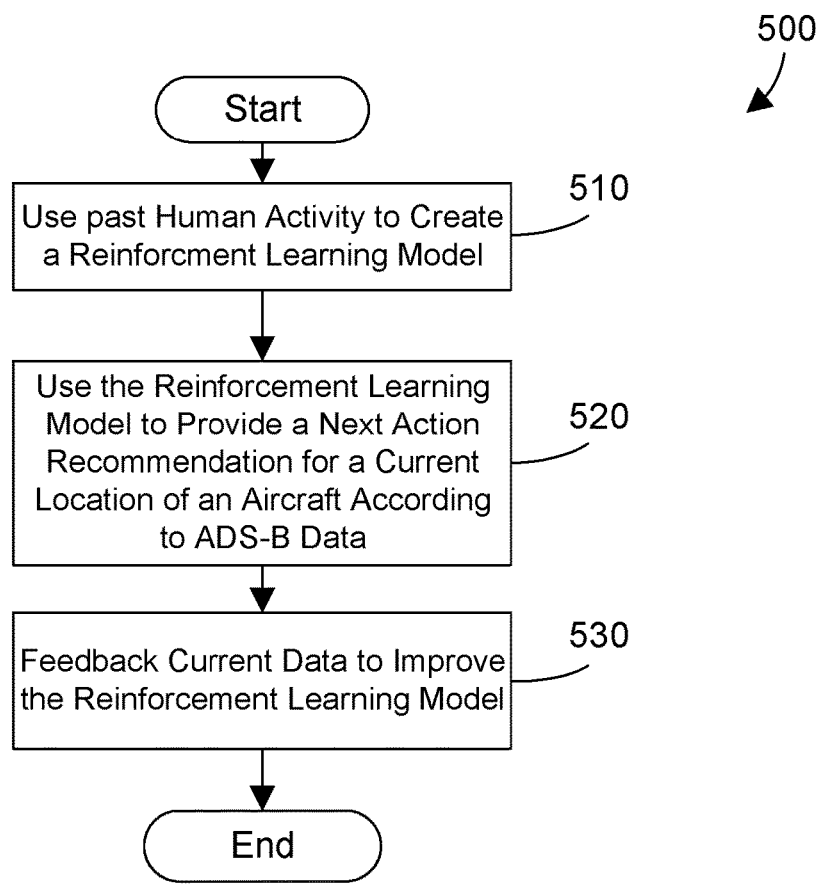
FIG. 5 is a flow diagram of a method for providing a next recommended action to an air traffic controller using reinforcement learning.

Referring to FIG. 5, a method 500 shows one suitable example for providing an action recommendation system for an air traffic controller using reinforcement learning. The steps of method 500 are preferably performed by the action recommendation system 122. First, use past human activity to create a reinforcement learning model (step 510). Next, use the reinforcement learning model to provide a next action recommendation for the current location of an aircraft according the current ADS-B data (step 520). Then feedback current data in improve the reinforcement learning model (step 530). The method is then done.

Figure 6:
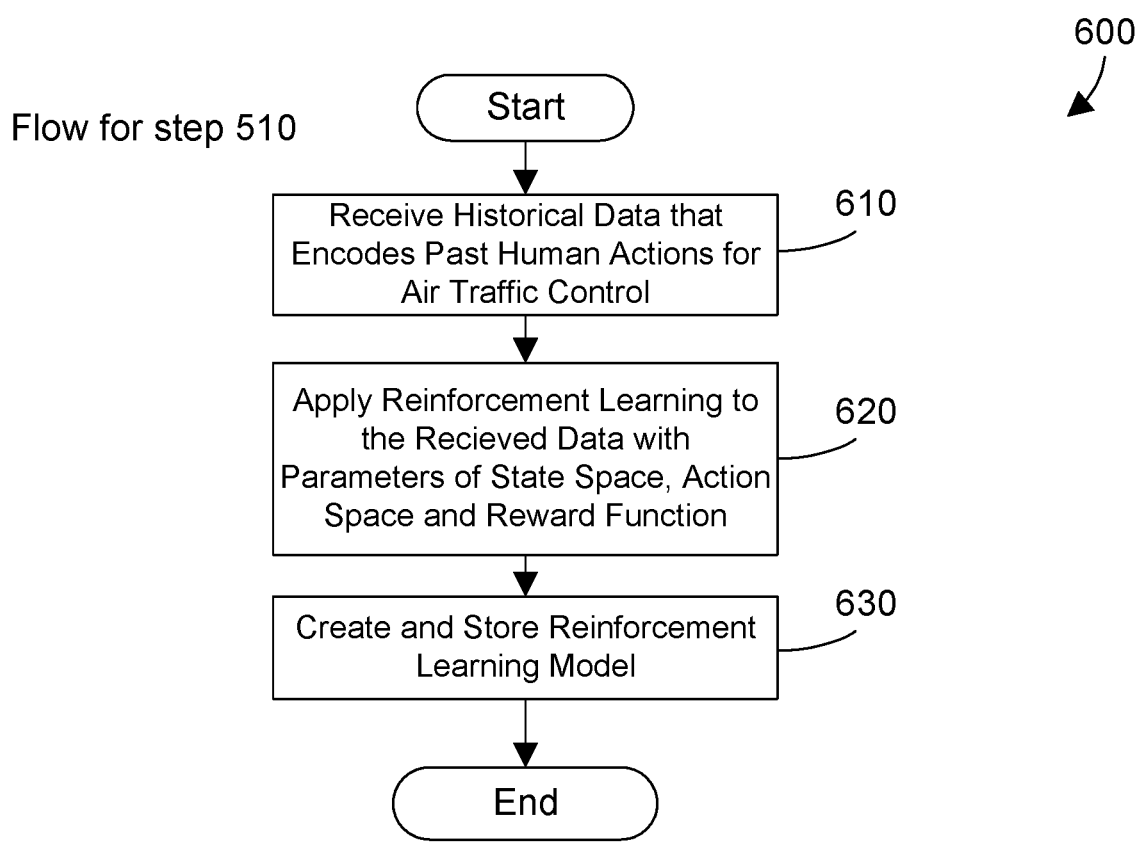
FIG. 6 is a flow diagram of that shows an example flow for step 510 in method 500.

Referring to FIG. 6, a method 600 shows one suitable example for using past human actions to create a reinforcement learning model. Thus, method 600 shows one suitable example for step 510 in method 500. The steps of method 600 are preferably performed by action recommendation system 122. First, receive historical data that encodes past human actions for air traffic control (step 610). Apply reinforcement learning to the received historical data with parameters of state space, action space and reward function (step 620). Next, create and store a reinforcement model (step 630). The method is then done.

Figure 7:
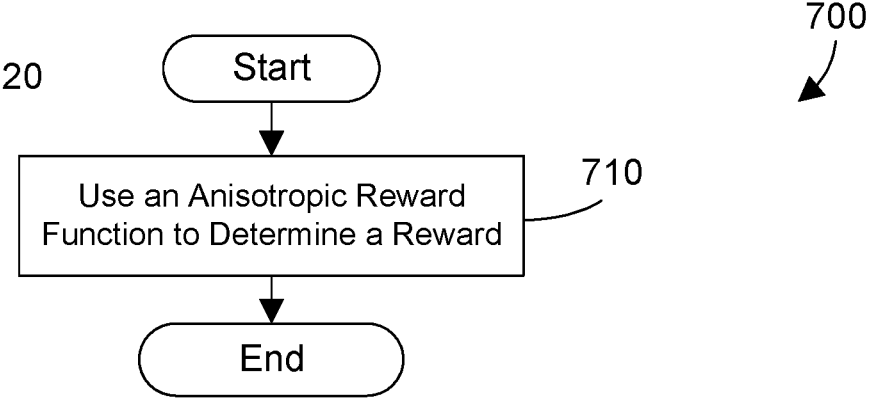

Referring to FIG. 7, a method 700 shows one suitable example for using the reinforcement learning model to provide a next action recommendation for the current location of an aircraft according the current ADS-B data. Thus, method 700 shows one suitable example for step 520 in method 500. The step of method 700 is preferably performed by action recommendation system 122. Use an anisotropic reward function to determine a reward (step 710). The method is then done.

Figure 8:
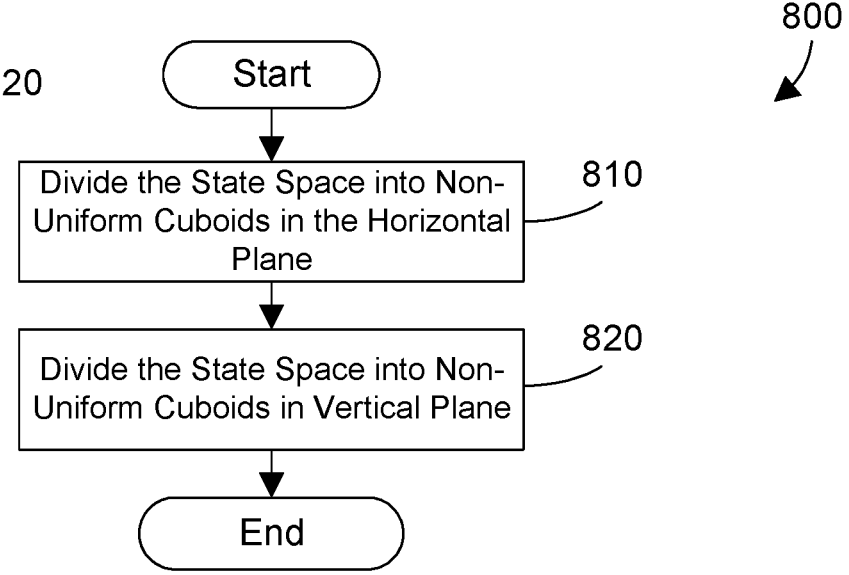
FIG. 8 is a flow diagram of that shows an example flow for step 620 in method 600.

Referring to FIG. 8, a method 800 shows one suitable example for applying reinforcement learning to the received historical data with parameters of state space, action space and reward function. Thus, method 800 shows one suitable example for step 620 in method 600. The steps of method 800 are preferably performed by action recommendation system 122. Divide the state space into non-uniform cuboids in the horizontal plane (step 810). Divide the state space into non-uniform cuboids in the vertical plane (step 820). The method is then done.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The claims and disclosure herein support an apparatus comprising: at least one processor; a memory coupled to the at least one processor; and an action recommendation system residing in the memory and executed by the at least one processor that uses data of past human actions to create a reinforcement learning model and then uses the reinforcement learning model with current aircraft data to provide a next action recommendation to give to an aircraft pilot to reach a destination.

The claims and disclosure herein further support a computer-implemented method executed by at least one processor provides next action recommendations for an aircraft comprising: creating a reinforcement learning model using past human actions; providing a next action recommendation to give to an aircraft pilot to reach a destination using the reinforcement learning model and a current aircraft data; and feeding back current data to improve the reinforcement learning model.

The claims and disclosure herein additionally support a computer-implemented method executed by at least one processor provides next action recommendations for an aircraft comprising: creating a reinforcement learning model using past human actions comprising: receiving data that encodes past human actions for air traffic control; applying reinforcement learning to the received data with parameters of state space, action space and a reward function, wherein the state space is iteratively expanded centered around the destination by dividing the state space into non-uniform cuboids in the horizontal plane, wherein the reward function is an anisotropic reward function that exploits that the destination is known; providing a next action recommendation to an aircraft controller to give an aircraft pilot to reach a destination using the reinforcement learning model and current aircraft data derived from Automatic Dependent Surveillance Broadcast data of the aircraft; feeding back current data to improve the reinforcement learning model.

As described above, a system and method use reinforcement learning to provide a next action recommendation to an air traffic controller to give to an aircraft pilot. Data of past human actions is used to create a reinforcement learning model and then the reinforcement learning model is used to provide the next action recommendation to the air traffic controller.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   an action recommendation system residing in the memory and executed by the at least one processor that uses data of past human actions to create a reinforcement learning model and then uses the reinforcement learning model with current vehicle data to provide a next action recommendation to give to a pilot to reach a destination; and
   an expanding state space module that uses a non-uniform granularity of a state space used by the reinforcement learning model, wherein the expanding state space module iteratively expands the state space centered around the destination by dividing the state space into non-uniform cuboids in the horizontal plane.

2. The apparatus of claim 1 wherein the action recommendation system further comprises an anisotropic reward function to exploit that the destination is known.

3. The apparatus of claim 2 wherein the anisotropic reward function uses flight criteria comprising: vehicle type, length of the trip, lateness of the arrival, weather conditions, and remaining fuel.

4. The apparatus of claim 1 wherein the past human actions are sourced from Automatic Dependent Surveillance Broadcast data.

5. The apparatus of claim 1 wherein the current vehicle data is derived from Automatic Dependent Surveillance Broadcast data for the current vehicle.

6. The apparatus of claim 1 wherein the reinforcement learning model comprises a neural network with deep Q reinforcement learning.

7. A computer-implemented method executed by at least one processor that provides next action recommendations for an aircraft comprising:
   creating a reinforcement learning model using past human actions, comprising:
      receiving data that describes past human actions for air traffic control; and
      applying reinforcement learning to the received data with parameters of state space, action space and a reward function, wherein the state space is iteratively expanded centered around a destination by dividing the state space into non-uniform cuboids in the horizontal plane;
   providing a next action recommendation to give to an aircraft pilot to reach the destination using the reinforcement learning model and a current aircraft data; and feeding back current data to improve the reinforcement learning model.

8. The method of claim 7 wherein the reward function is an anisotropic reward function that exploits that the destination is known.

9. The method of claim 8 wherein the reward function uses flight criteria comprising: the aircraft type, length of the trip, lateness of the arrival, weather conditions, FAA regulations, and remaining fuel.

10. The method of claim 7 wherein the past human actions are derived from Automatic Dependent Surveillance Broadcast data.

11. The method of claim 7 wherein the current aircraft data is derived from Automatic Dependent Surveillance Broadcast data of the aircraft.

12. The method of claim 7 wherein the reinforcement learning model is a neural network used with deep Q reinforcement learning.

13. A computer-implemented method executed by at least one processor provides next action recommendations for an aircraft comprising:
  creating a reinforcement learning model using past human actions comprising:
    receiving data that encodes past human actions for air traffic control;
    applying reinforcement learning to the received data with parameters of state space, action space and a reward function, wherein the state space is iteratively expanded centered around a destination by dividing the state space into non-uniform cuboids in the horizontal plane, wherein the reward function is an anisotropic reward function that exploits that the destination is known;
  providing a next action recommendation to an aircraft controller to give an aircraft pilot to reach a destination using the reinforcement learning model and current aircraft data derived from Automatic Dependent Surveillance Broadcast data of the aircraft; and
  feeding back current data to improve the reinforcement learning model.

14. The method of claim 13 wherein the past human actions are derived from Automatic Dependent Surveillance Broadcast data.

15. The method of claim 13 wherein the reinforcement learning model comprises a neural network with deep Q reinforcement learning.

* * * * *